United States Patent
Anderson

(12) 
(10) Patent No.: US 6,383,409 B1
(45) Date of Patent: May 7, 2002

(54) AMMONIUM BIACETATE AS A HEAT STORAGE MATERIAL

(75) Inventor: Albert Gordon Anderson, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/810,797

(22) Filed: Mar. 16, 2001

Related U.S. Application Data

(60) Provisional application No. 60/191,243, filed on Mar. 22, 2000.

(51) Int. Cl.[7] .............................. C09K 5/00; C09K 5/14
(52) U.S. Cl. ...................... 252/70; 165/10; 165/104.17
(58) Field of Search ............................... 252/70; 165/10, 165/104.17; 562/607

(56) References Cited

U.S. PATENT DOCUMENTS

| | | | | |
|---|---|---|---|---|
| 4,412,930 A | * | 11/1983 | Koike et al. | 252/70 |
| 4,415,465 A | * | 11/1983 | Koike et al. | 252/70 |
| 4,487,856 A | * | 12/1984 | Anderson et al. | 523/205 |
| 4,518,514 A | * | 5/1985 | Kamohara et al. | 252/70 |
| 4,737,484 A | * | 4/1988 | Iwasaki et al. | 503/209 |

FOREIGN PATENT DOCUMENTS

| | | | |
|---|---|---|---|
| JP | 57-149380 | * | 9/1982 |

OTHER PUBLICATIONS

Davidson, A. W., Sisler, H. H., Stoenner, R., J. Am. Chem. Soc. 66, 779–782, (May 1944).

Nahringbauer, I., Acta. Chem. Scand. (1968) 22 (4), 1141–1158 and (1969) 23 (5), 1653–1666, (No month).

* cited by examiner

*Primary Examiner*—Anthony Green

(57) ABSTRACT

Ammonium biacetate is a useful material for heat storage applications such as culinary implements, medicinal uses, and solar energy storage.

6 Claims, No Drawings

AMMONIUM BIACETATE AS A HEAT STORAGE MATERIAL

This application claims the benefit of Provisional Application No. 60/191,243, filed on 03/22/2000.

FIELD OF THE INVENTION

The present invention relates to the use of ammonium biacetate as a heat storage material.

TECHNICAL BACKGROUND

The potential of objects for heat storage is based on a variety of thermodynamic properties. Heat storage potential can be based on the sensible heat of a fluid such as water or the sensible heat of a solid such as stone. Sensible heat is the amount of energy needed to change the temperature of a substance without changing the phase of that substance. Heat storage potential of a material can also be based on the heat of transition of a material as it changes from one physical state to another, e.g., the heat of fusion or heat of vaporization. Additionally, heat storage potential can be determined by a combination of sensible heat and heat of a transition, particularly the latent heat of fusion, using materials such as inorganic salt hydrates, paraffin or organic polymers.

The heat of fusion is a particularly effective indicator for determining the heat storage potential of materials. Energy is absorbed by the transition of a material from solid to liquid and released by the transition of a material from liquid to solid. During uptake or release of energy during phase change, the temperature of a material is a constant value that is referred to as "phase transition temperature". The amount of energy that changes the state of matter of a substance, e.g., from solid state to liquid state, but does not change the temperature of that substance, is the heat of fusion ($\Delta H_f$). A higher heat of fusion of a material indicates a greater heat storage potential of such materials at the phase transition temperature.

To add heat energy to a heat storage material, the phase transition temperature of a heat storage material must be below the temperature of the material from which heat is to be transferred. To retrieve heat from a heat storage material, the phase transition temperature of the heat storage material must be equal to or greater than the temperature to be maintained by the stored heat in the heat storage material.

Materials that melt incongruently, i.e., the composition of the melt differs from the composition of the solid, and materials that supercool upon solidification, i.e., exist as liquids at temperatures below their freezing points, do not exhibit reliable transition properties, and thus are not as useful as heat storage materials. For example, salt hydrates generally melt at temperatures in a range to make them potentially useful as heat storage materials. Unfortunately, salt hydrates undergo significant supercooling which decreases their usefulness as heat storage materials. Methods employed to prevent the supercooling of salt hydrates include the addition of seed crystals to salt hydrates. However, seed crystals often separate due to gravity and thereby become unavailable to seed salt hydrate crystals. Salt hydrates can also produce gels which make them undesirable as heat storage materials. Examples of salt hydrates include sodium sulfate decahydrate ($Na_2SO_4.10\ H_2O$) which melts incongruently, and sodium acetate trihydrate ($CH_3CO_2Na.3\ H_2O$), which, although melting congruently at a sharp melting point, 58° C., supercools and is thereby undesirable as a heat storage material. Salts themselves do not generally make good heat storage materials because the melting point of most salts is too high for most heat storage applications.

End uses for heat storage materials, such as culinary implements (i.e., steam table inserts and other food containers that must hold food at an optimum temperature), require that the materials perform well at elevated temperatures. Many heat storage materials do not perform well at desired temperatures. A good heat storage material for a specific end use would have (1) a transition temperature that is close to the desired temperature of the substance for which the heat storage material is being used, and (2) resistance to supercooling, and (3) exhibit congruent melting at the melting point of the heat storage material. Other considerations for determining a good heat storage material can include cost of production and relative toxicity.

In view of the foregoing, applicants have developed a heat storage material that has a high heat of fusion, melting range about 65° C., low toxicity, low production expense, and can be used in containers of any shape and size.

SUMMARY OF THE INVENTION

The present invention relates to a process of storing heat comprising using ammonium biacetate to store heat energy.

This invention also relates to a heat storage device comprising ammonium biacetate and a container for containing the ammonium biacetate. It further relates to a method for holding food or other matter at a constant temperature comprising the steps of:

(a) heating a heat storage device comprising ammonium biacetate and a container for housing said ammonium biacetate; and (b) placing the food to be temperature-controlled in proximity to the heat storage device thereby maintaining the temperature of the food until the heat from the heat storage device dissipates; and (c) optionally moving said food in proximity to said heat storage device from one location to another.

DETAILS OF THE INVENTION

Ammonium biacetate ($NH_4.H.(OAc)_2$), wherein OAc represents an acetate group ($CH_3COO^-$), is unique as far as its use as a heat storage medium is concerned, as it does not supercool, melts congruently, and does not require seeding, e.g., by using a nucleating agent. The melting point/freezing point of ammonium biacetate is 65° C.–66° C. As this invention teaches, the heat of fusion ($\Delta H_f$) of ammonium biacetate is 35 cal/g–38 cal/g. Ammonium biacetate cycles well, meaning that it can melt and resolidify indefinitely without decomposition. Upon melting, ammonium biacetate expands only slightly making it useful for packaging in closed containers.

Ammonium biacetate can be made by combining ammonium acetate and acetic acid, heating to dissolve any ammonium acetate formed, followed by distilling off any unreacted acetic acid (see Example 1 below). The method of Example 1 is derived from that disclosed in A. W. Davidson, H. H. Sisler and R. Stoenner, J. Amer. Chem. Soc., 66 (1944) 779–782.

Equation 1 represents a potential synthesis used in this invention:

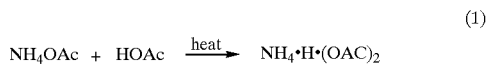

$$NH_4OAc + HOAc \xrightarrow{heat} NH_4 \cdot H \cdot (OAc)_2 \quad (1)$$

The product of equation (1) is ammonium biacetate which forms a crystalline structure when solidified as described in I. Nahringbauer, Acta. Chem. Scand. (1968), 22(4), 1141–58 and (1969), 23(5), 1653–66. The crystal structure reveals hydrogen bonding that increases the amount of attraction between the molecules. The increased attraction between molecules may be responsible for the unexpectedly high heat of fusion which makes possible the use of ammonium biacetate as a heat storage material.

The product is hygroscopic, so it is preferred that ammonium biacetate be manufactured and used in a sealed system.

Ammonium biacetate can be used neat or combined with other substances that do not react with ammonium biacetate. Examples of these substances include, but are not limited to, clays, metal such as stainless steel (powder, shot, beads, etc.), cementitious materials, and other materials which are substantially inert with respect to ammonium biacetate and acetates in general. By substantially inert is meant that the substantially inert substance may not react with ammonium biacetate so as to change the heat of fusion ($\Delta H_f$) of the original mass of ammonium biacetate more than 2° C. Any ratio of ammonium biacetate may be used in any amount in combination with the substantially inert substances. containers can comprise any material that is substantially inert in the presence of ammonium biacetate, e.g., stainless steel, plastics and glass. Containers may be rigid (i.e., stainless steel or rigid plastic containers) or flexible enough to conform to the shape of another object. Other materials that could be used to hold ammonium biacetate would be known to those skilled in the art. Ammonium biacetate could be used in any end-use requiring the storage of heat. Such uses include culinary utensils, such as food service trays, steam table inserts and the like; medicinal uses such as heating pads and hot-water bottles; and storage of solar energy for heating purposes. A further example of the use of this invention is that of a method for holding food or other material at a constant temperature by heating a heat storage device comprising ammonium biacetate and a container for containing the ammonium biacetate; and placing the food or other matter (e.g., water) to be temperature-controlled in proximity to the heat storage device thereby maintaining the temperature of the food. These devices could be stationary or mobile.

EXAMPLES

Example 1

Synthesis of Ammonium Biacetate, $NH_4 \cdot H \cdot (OAc)_2$

Into a 500 ml round bottom flask 38.5 grams (0.5 mole) ammonium acetate and 30 grams (0.5 mole) acetic acid were admixed. The flask was subsequently heated under nitrogen until all solids were melted. The reaction mixture was then distilled in a distillation column from 80°–151° C. at 20 mm Hg pressure, using steam in the distillation condenser. The first fraction was discarded, and the second fraction was collected at 15 mm Hg pressure and 70° C. The melting point of the distilled product was found to be 67.86°±1.08° C. (literature value 69° C.), and the delta heat of fusion of the distilled product was found to be 37.44±1.97 cal/g.

The melting point and delta heat of fusion were determined by differential scanning calorimetry (DSC), an analytical technique that measures heat flow and temperature associated with transitions between states of matter. In this method, the sample and a reference material are subjected to a closely controlled temperature. In the event that a phase change occurs in the sample, thermal energy is added to or subtracted from the sample or reference materials in order to maintain both sample and reference at the same temperature. Because this energy input is precisely equivalent in magnitude to the energy absorbed or evolved in the transition between solid and liquid, quantification of the balancing energy yields a direct calorimetric measurement of the transition energy, i.e., $\Delta H_f$.

Specifically, during differential scanning calorimetry the sample was analyzed under a nitrogen atmosphere at 50 ml/min flow, heating rate of 10° C./min, and a temperature scan of 0° C. to 90° C. The data were obtained on a TA 2910 DSC coupled to a TA 5000 controller (TA Instruments, New Castle, Del.).

What is claimed is:

1. A heat storage device comprising ammonium biacetate and a container for housing said ammonium biacetate.

2. The device of claim 1 further comprising a material that is substantially inert in the presence of ammonium biacetate and acetates.

3. The device of claim 1 wherein said container is rigid.

4. The device of claim 1 wherein said container is flexible.

5. A method for holding food or other matter at a constant temperature comprising the steps of:

(a) heating a heat storage device comprising ammonium biacetate and a container for housing said ammonium biacetate; and (b) placing the food or other matter to be temperature-controlled in proximity to the heat storage device thereby maintaining the temperature of the food or other matter.

6. The method of claim 5 further comprising moving said heat storage device and said food or other matter from one location to another.

* * * * *